(12) United States Patent
Otaguro

(10) Patent No.: US 7,745,972 B2
(45) Date of Patent: Jun. 29, 2010

(54) PRECISE POSITIONING APPARATUS

(75) Inventor: Tetsunori Otaguro, Tokyo (JP)

(73) Assignee: Hirata Corporation (JP)

( * ) Notice: Subject to any disclaimer, the term of this patent is extended or adjusted under 35 U.S.C. 154(b) by 35 days.

(21) Appl. No.: 11/886,427

(22) PCT Filed: Mar. 16, 2005

(86) PCT No.: PCT/JP2005/004608

§ 371 (c)(1),
(2), (4) Date: May 12, 2008

(87) PCT Pub. No.: WO2006/098010

PCT Pub. Date: Sep. 21, 2006

(65) Prior Publication Data

US 2009/0045699 A1  Feb. 19, 2009

(51) Int. Cl.
*H01L 21/68* (2006.01)
(52) U.S. Cl. .................. 310/323.17; 310/348
(58) Field of Classification Search ............ 310/323.17, 310/348
See application file for complete search history.

(56) References Cited

U.S. PATENT DOCUMENTS 4,686,440 A  8/1987  Hatamura ............... 318/638
5,636,062 A * 6/1997  Okuyama et al. ........... 359/700
6,467,762 B1 * 10/2002  Davies ...................... 269/71
6,774,538 B2 * 8/2004  Hata ......................... 310/328

FOREIGN PATENT DOCUMENTS

| JP | 60-25284    | 2/1985 |
| JP | 06-170762   | 6/1994 |
| JP | 2677625     | 7/1997 |
| JP | 2004-014073 | 1/2004 |

* cited by examiner

*Primary Examiner*—Walter Benson
*Assistant Examiner*—Bryan P Gordon
(74) *Attorney, Agent, or Firm*—Bacon & Thomas, PLLC

(57) ABSTRACT

A precision positioning device 1 having degrees of freedom along multi-axial directions includes a single unitary structure 2 and a plurality of expansion/contraction actuators 4a, 4b, and 4c. Movements of an object-to-be-positioned in the axial directions are effected through such elastic deformations of the unitary structure 2 as to move the object-to-be-positioned only in the axial directions. Forces to generate the elastic deformations are based on expansion/contraction of the expansion/contraction actuators 4a, 4b, and 4c incorporated in the unitary structure 2. The expansion/contraction actuators 4a, 4b, and 4c can be formed of piezoelectric elements.

12 Claims, 2 Drawing Sheets

PRECISE POSITIONING APPARATUS

TECHNICAL FIELD

The present invention applies to a precision positioning device and, more particularly, to a precision positioning device having a simple structure and capable of precisely positioning an object-to-be-positioned in multi-axial directions in a multidimensional space.

BACKGROUND ART

Conventionally, a precision positioning device converts a torque of a motor to force for moving an object-to-be-positioned via a gear reduction mechanism, a feed screw mechanism, or the like and moves the object-to-be-positioned to a set position by controlling rotation of the motor while feeding back to the motor the current position of the object-to-be-positioned by use of a position sensor or the like. In this case, a mechanism for converting an electric force to a mechanical force for moving the object-to-be-positioned and a feedback control system must have high precision. Such a device becomes very complicated in mechanism, and adjustment and control require considerable skills and time.

There have been proposed various devices which enable precision positioning without use of such a mechanism for converting an electric force to a mechanical force for moving an object-to-be-positioned; i.e., by use of expansion/contraction actuators, such as piezoelectric elements, for converting an electric force directly to a mechanical force for moving an object-to-be-positioned (Patent Documents 1 to 3).

Patent Document 1: Japanese Patent No. 2677625
Patent Document 2: Japanese Patent Application Laid-Open (kokai) No. H6-170762
Patent Document 3: US Patent Application Publication No. 20004/0140737

However, the positioning devices disclosed in Patent Documents 1 and 2 have only one degree of freedom; i.e., along a single axial direction. The positioning device disclosed in Patent Document 3 is designed to position an object-to-be-positioned in a multidimensional space. However, the device is not designed to carry out positioning through elastic deformation of only a single unitary structure, but is designed to carry out positioning through a combination of elastic deformations of a plurality of unitary structures. Thus, the overall structure of the device is very complex.

DISCLOSURE OF THE INVENTION

Problems to be Solved by the Invention

An object of the present invention is to solve the above-mentioned problems in the conventional precision positioning devices and to provide a precision positioning device having a simple structure and capable of precisely positioning an object-to-be-positioned in multi-axial directions in a multidimensional space.

Means for Solving the Problems

According to the present invention, the above-mentioned problems are solved by the following precision positioning device.

The precision positioning device has degrees of freedom along multi-axial directions and comprises a single unitary structure and a plurality of expansion/contraction actuators. Movements of an object-to-be-positioned in the axial directions are effected through such elastic deformations of the unitary structure as to move the object-to-be-positioned only in the axial directions. Forces to generate the elastic deformations are based on expansion/contraction of the expansion/contraction actuators incorporated in the unitary structure.

The precision positioning device is configured as mentioned above; i.e., a mechanism for positioning an object-to-be-positioned by moving the object-to-be-positioned in multi-axial directions comprises only the single unitary structure and the plurality of expansion/contraction actuators incorporated in the unitary structure. Thus, the precision positioning device has a very simple structure and can relate the amounts of expansion/contraction of the expansion/contraction actuators directly to the amounts of elastic deformation of the unitary structure, thereby enabling precision positioning.

According to a preferred embodiment, the expansion/contraction actuators are formed of piezoelectric elements. This can relate the quantities of electricity input to the piezoelectric elements directly to the amounts of elastic deformation of the unitary structure. Thus, by means of precisely controlling the quantities of electricity input to the piezoelectric-elements, the amounts of elastic deformation of the unitary structure can be precisely controlled. Furthermore, the control is relatively simple, so that an object-to-be-positioned can be precisely positioned with ease.

According to another preferred embodiment, the precision positioning device has degrees of freedom along three axial directions. This enables precision positioning of an object-to-be-positioned at any position in a three-dimensional space.

Effects of the Invention

As mentioned above, according to the precision positing device of the present invention, the mechanism for positioning an object-to-be-positioned by moving the object-to-be-positioned in multi-axial directions comprises only the single unitary structure and the plurality of expansion/contraction actuators incorporated in the unitary structure. Thus, the mechanism has a very simple structure and can relate the amounts of expansion/contraction of the expansion/contraction actuators directly to the amounts of elastic deformation of the unitary structure, thereby enabling precision positioning.

Also, in the case where the expansion/contraction actuators are formed of piezoelectric elements, by means of precisely controlling the quantities of electricity input to the piezoelectric elements, an object-to-be-positioned can be precisely positioned with ease. Furthermore, in the case where the precision positioning device has degrees of freedom along three axial directions, an object-to-be-positioned can be precisely positioned at any position in a three-dimensional space.

Figure 1:
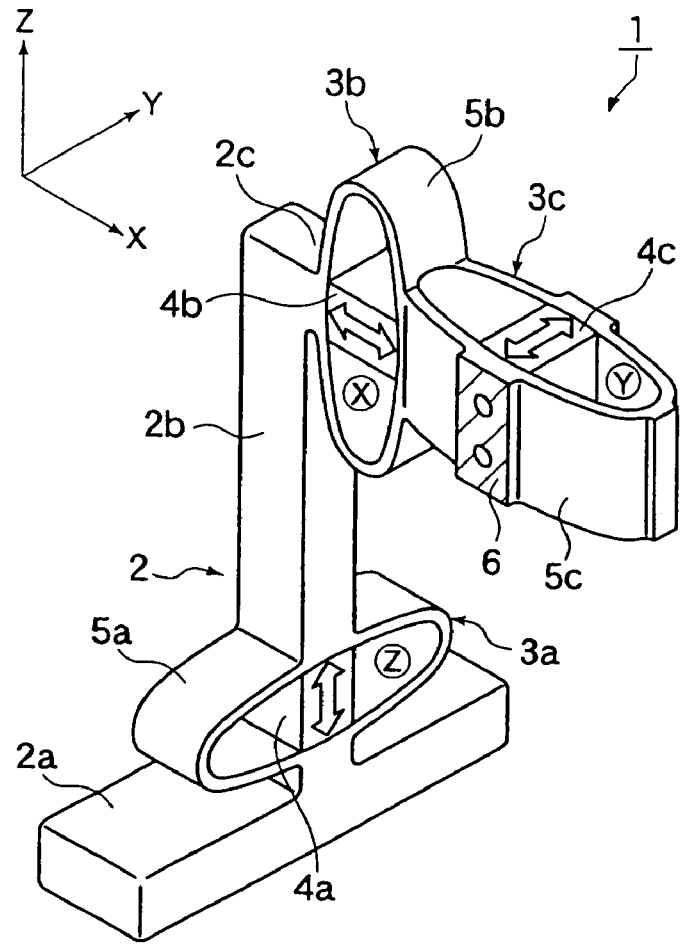
[FIG. 1] Perspective view of a precision positioning device of an embodiment (Embodiment 1) of the present invention.

DESCRIPTION OF REFERENCE NUMERALS 1, 1': precision positioning device
2, 2': unitary structure
2a, 2a': base portion
2b, 2b': vertical portion
2c, 2c', 2d': horizontal portion
3a: Z-axis-direction elastically deformable portion
3b, 3b': X-axis-direction elastically deformable portion
3c, 3c': Y-axis-direction elastically deformable portion
4a, 4b, 4b', 4c, 4c': expansion/contraction actuator
5a: first tubular portion
5b, 5b': second tubular portion
5c, 5c': third tubular portion
6: tool-mounting face

BEST MODE FOR CARRYING OUT THE INVENTION

A precision positioning device having degrees of freedom along three axial directions includes a single unitary structure and a plurality of expansion/contraction actuators. Movements of an object-to-be-positioned in the axial directions are effected through such elastic deformations of the unitary structure as to move the object-to-be-positioned only in the axial directions. Forces to generate the elastic deformations are based on expansion/contraction of the expansion/contraction actuators incorporated in the unitary structure. The expansion/contraction actuators are formed of piezoelectric elements.

Embodiment 1

Next, an embodiment (Embodiment 1) of the present invention will be described.

FIG. 1 is a perspective view of a precision positioning device of Embodiment 1. A precision positioning device 1 of Embodiment 1 has degrees of freedom along three axial directions. As shown in FIG. 1, the precision positioning device 1 includes a Z-axis-direction elastically deformable portion 3a provided at a vertical portion 2b standing upright from a base portion 2a of a unitary structure 2; an X-axis-direction elastically deformable portion 3b provided at the proximal side of a horizontal portion 2c extending horizontally from the upper end of the vertical portion 2b and perpendicular to the vertical portion 2b; and a Y-axis-direction elastically deformable portion 3c provided at the distal side of the horizontal portion 2c and adjacently to the X-axis-direction elastically deformable portion 3b. The Z-, X-, and Y-axis-direction elastically deformable portions 3a, 3b, and 3c have expansion/contraction actuators 4a, 4b, and 4c, respectively, incorporated therein. The precision positioning device 1 further includes respective electric circuits for connecting the expansion/contraction actuators 4a, 4b, and 4c to a power supply, a control unit for controlling currents which flow through the electric circuits, etc., which are not shown.

Figure 4:
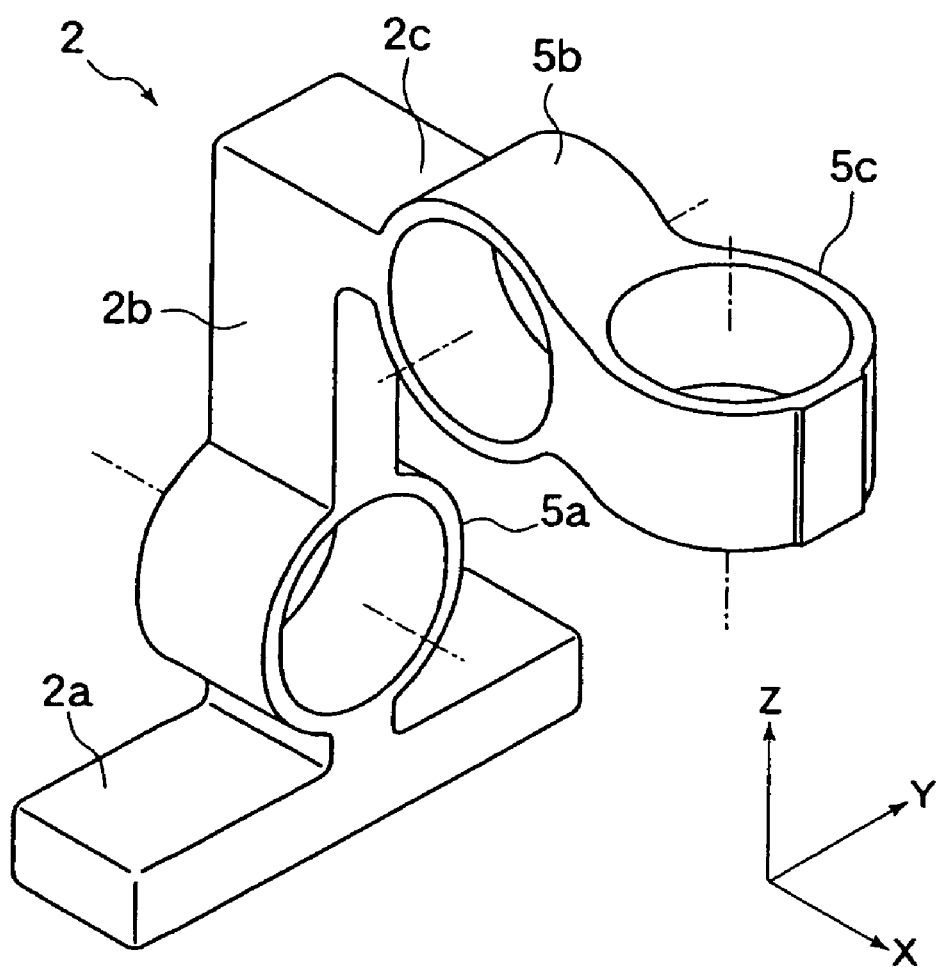
[FIG. 4] Perspective view of a unitary structure which is cut out from a metal material on a wire cut machine.

The unitary structure 2 is formed from an electrically conductive metal material, desirably a metal material used to form a spring. Such metal material is cut in three axial directions on a wire cut machine so as to assume the shape of a unitary structure as shown in FIG. 4. The vertical portion 2b has a first tubular portion 5a which is formed by cutting, is located toward the base portion 2a, and has an axis along the X-axis direction; a second tubular portion 5b which is formed by cutting, is located at the proximal side of the horizontal portion 2c, and has an axis along the Y-axis direction; and a third tubular portion 5c which is formed by cutting, is located at the distal side of the horizontal portion 2c, and has an axis along the Z-axis direction. The end faces of the first, second, and third tubular portions 5a, 5b, and 5c are orthogonal to one another.

Cross sections of the vertical and horizontal portions 2b and 2c excluding the first, second, and third tubular portions 5a, 5b, and 5c (cross sections taken orthogonally to the X-axis and to the Y-axis) assume a rectangular shape as a result of cutting on a wire cut machine. However, no particular limitation is imposed on the cross-sectional shape. The first, second, and third tubular portions 5a, 5b, and 5c do not necessarily assume a tubular form. However, desirably, the first, second, and third tubular portions 5a, 5b, and 5c are formed symmetrically with respect to an X-Z plane passing through the axis of the vertical portion 2b, an X-Y plane passing through the axis of the horizontal portion 2c, and a plane which passes through the axis along the expansion/contraction direction of the expansion/contraction actuator 4c and is parallel to a Y-Z plane, respectively. Such formation enables bias-free elastic deformation with respect to the X-, Y-, and Z-axis directions. Desirably, the third tubular portion 5c is formed symmetrically also with respect to an X-Z plane passing through the axis of the horizontal portion 2c. By virtue of such formation, two walls of the third tubular portion 5c which face each other with respect to the X-Z plane are equally displaced by half of the amount of expansion/contraction of the expansion/contraction actuator 4c.

The expansion/contraction actuator 4a, which is analogous to a stack actuator composed of piezoelectric elements and electrodes arranged alternately in layers, is incorporated into the thus-formed first tubular portion 5a coaxially with the vertical portion 2b and such that its stacking direction is oriented in the Z-axis direction. Thus is formed the aforementioned Z-axis-direction elastically deformable portion 3a. Similarly, the expansion/contraction actuator 4b is incorporated into the second tubular portion 5b coaxially with the horizontal portion 2c and such that its stacking direction is oriented in the X-axis direction, thereby forming the aforementioned X-axis-direction elastically deformable portion 3b. Also, similarly, the expansion/contraction actuator 4c is incorporated into the third tubular portion 5c such that its stacking direction is oriented in the Y-axis direction and in such a manner as to be positioned at a central portion of the third tubular portion 5c. Thus, the aforementioned Y-axis-direction elastically deformable portion 3c is formed.

Figure 3:
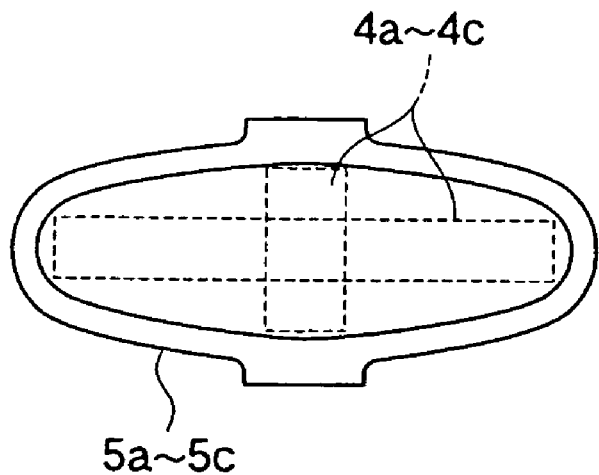
[FIG. 3] Explanatory view showing two modes of incorporation of an expansion/contraction actuator into an elastically deformable portion of a unitary structure.

Notably, the expansion/contraction actuators 4a, 4b, and 4c may be incorporated into the first, second, and third tubular portions 5a, 5b, and 5c, respectively, such that their stacking directions are oriented orthogonally to the above-mentioned directions, as shown in FIG. 3. In this case, the lengths of the expansion/contraction actuators 4a, 4b, 4c along the stacking direction must be changed as appropriate.

A tool-mounting face 6 in parallel with an X-Z plane is formed on the outer peripheral surface of the third tubular portion 5c, which serves as a terminal end portion of the unitary structure 2 in relation to the base portion 2a. The tool-mounting face 6 is smoothly finished by grinding. Tools of various kinds are attached to the tool-mounting face 6. Examples of such tools include micro-gripper, various kinds of inspection tools, probes (needles and contactors), cameras, various kinds of sensors, and various kinds of actuators. These tools serve as the aforementioned object-to-be-positioned.

Control current is supplied from an unillustrated direct-current power supply to the expansion/contraction actuators 4a, 4b, and 4c incorporated in the first, second, and third tubular portions 5a, 5b, and 5c, respectively. This causes the expansion/contraction actuators 4a, 4b, and 4c to yield respective predetermined amounts of expansion/contraction from the piezoelectric effect. An expansion/contraction of the expansion/contraction actuator 4a elastically deforms the first tubular portion 5a, thereby yielding an amount of expansion/contraction of the vertical portion 2b. This results directly in displacement in the Z-axis direction of an object-to-be-positioned. An expansion/contraction of the expansion/contraction actuator 4b elastically deforms the second tubular portion 5b, thereby yielding an amount of expansion/contraction of the horizontal portion 2c. This results directly in displacement in the X-axis direction of the object-to-be-positioned. An expansion/contraction of the expansion/contraction actuator 4c elastically deforms the third tubular portion 5c, thereby yielding an amount of expansion/contraction of the third tubular portion 5c in a direction (Y-axis direction) orthogonal to the horizontal portion 2c. This results directly in displacement in the Y-axis direction of the object-to-be-positioned by a predetermined fraction (half) of the amount of expansion/contraction.

The expansion/contraction actuators 4a, 4b, and 4c can be expanded/contracted roughly by respective desired amounts by supplying current in accordance with a previously prepared characteristic diagram showing the relation between an input quantity of electricity and an amount of expansion/contraction. The expansion/contraction actuators 4a, 4b, and 4c can be expanded/contracted more precisely by feedback control; specifically, by detecting the current positions of the expansion/contraction actuators 4a, 4b, and 4c by use of unillustrated position sensors, strain gauze sensors, visions, or the like and feeding back the detected current positions to a current control system.

These displacements of the object-to-be-positioned in the Z-, X-, and Y-axis directions synthetically result in accurate positioning of the object-to-be-positioned at a predetermined position in a three-dimensional space to a very high precision; specifically, on the order of nanometers to several hundreds of micrometers.

Strictly, an expansion/contraction of the expansion/contraction actuator 4c results in not only displacement in the Y-axis direction of the object-to-be-positioned but also displacement in the X-axis direction of the object-to-be-positioned. However, in many cases, the displacement in the X-axis direction may be negligible. If not, by means of correcting the amount of expansion/contraction of the expansion/contraction actuator 4b, the object-to-be-positioned can be correctly positioned in the X-axis direction.

The above-mentioned correction of the amount of expansion/contraction of the expansion/contraction actuator 4b becomes unnecessary by employing the following constitution: a distal end portion of the horizontal portion 2c having the second tubular portion 5b is bent at a right angle in a horizontal plane so as to form a new horizontal portion; the third tubular portion 5c is formed at the distal end of the new horizontal portion; and the Y-axis-direction elastically deformable portion 3c having the same structure as above is provided at the third tubular portion 5c in the same posture as above. By virtue of this, an expansion/contraction of the expansion/contraction actuator 4c can result in displacement only in the Y-axis direction of the object-to-be-positioned, thereby eliminating the above-mentioned need to correct the amount of expansion/contraction of the expansion/contraction actuator 4b. Furthermore, an expansion/contraction of the expansion/contraction actuator 4c results directly in displacement in the Y-axis direction of the object-to-be-positioned, thereby eliminating the above-mentioned need to perform fractional calculation on the amount of expansion/contraction-of the third tubular portion 5c and thus considerably simplifying control of positioning in the Y-axis direction of the object-to-be-positioned.

The precision positioning device 1 of Embodiment 1 has the above-described constitution and thus can yield the following effects.

The mechanism for positioning an object-to-be-positioned (tools of various kinds, etc.) by moving the object-to-be-positioned in three axial directions is composed only of the single unitary structure 2 and a plurality of expansion/contraction actuators 4a, 4b, and 4c incorporated in the unitary structure 2. Thus, the mechanism has a very simple structure and can relate the amounts of deformation of the expansion/contraction actuators 4a, 4b, and 4c directly to the amounts of elastic deformation of the Z-axis-direction elastically deformable portion 3a, the X-axis-direction elastically deformable portion 3b, and the Y-axis-direction elastically deformable portion 3c, respectively, of the unitary structure 2, whereby the object-to-be-positioned can be precisely positioned at any position in a three-dimensional space.

Since piezoelectric elements are used to form the expansion/contraction actuators 4a, 4b, and 4c, the quantities of electricity input to the piezoelectric elements can be related directly to the amounts of elastic deformation of the elastically deformable portions 3a, 3b, and 3c of the unitary structure 2. Thus, by means of precisely controlling the quantities of electricity input to the piezoelectric elements, the amounts of elastic deformation of the elastically deformable portions 3a, 3b, and 3c can be precisely controlled. Furthermore, the control is relatively simple, so that the object-to-be-positioned can be precisely positioned with ease.

Embodiment 2

Next, another embodiment (Embodiment 2) of the present invention will be described.

Figure 2:
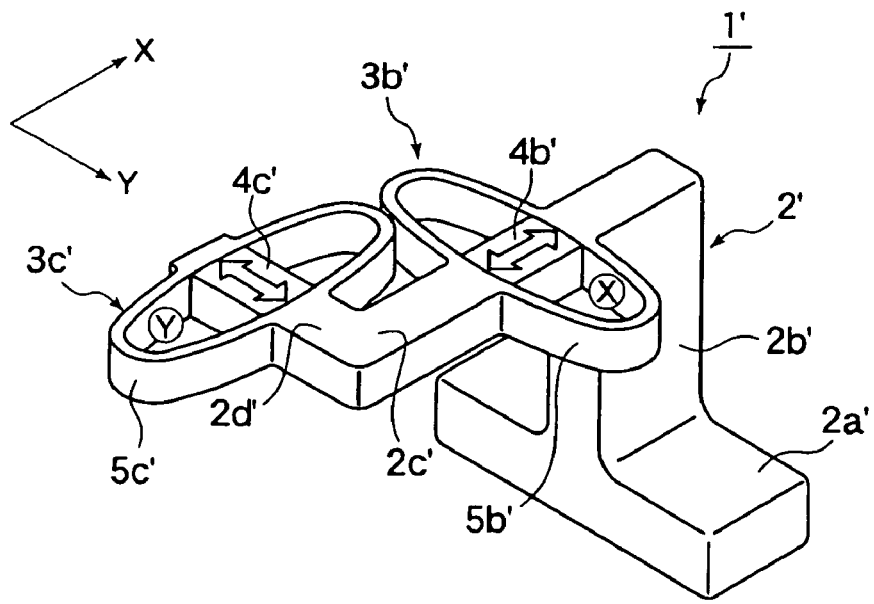
[FIG. 2] Perspective view of a precision positioning device of another embodiment (Embodiment 2) of the present invention.

FIG. 2 is a perspective view of a precision positioning device 1' of Embodiment 2. Structural features corresponding to those of the precision positioning device 1 of Embodiment 1 are denoted by reference numerals which are used to denote those of the precision positioning device 1 of Embodiment 1 and which are accompanied by "'".

The precision positioning device 1' of Embodiment 2 differs from the precision positioning device 1 of Embodiment 1 in the following: a Z-axis-direction elastically deformable portion 3a' is omitted, so that a degree of freedom along the Z-axis direction is cancelled, and degrees of freedom only along the X- and Y-axis directions are available; an X-axis-direction elastically deformable portion 3b' is angularly displaced by 90° about the X-axis; and a portion of a horizontal portion 2c' which is located on the distal side of the X-axis-direction elastically deformable portion 3b' is bent at a right angle in the same horizontal plane to thereby form a new horizontal portion 2d', and a Y-axis-direction elastically deformable portion 3c' is provided at the distal end of the horizontal portion 2d'. Since other structural features remain unchanged, further detailed description is omitted.

In the precision positioning device 1' of Embodiment 2, the Y-axis-direction elastically deformable portion 3c' is provided at the distal end of the horizontal portion 2d'. Therefore, an expansion/contraction of an expansion/contraction actuator 4c' can result directly in displacement in the Y-axis direction of an object-to-be-positioned, thereby simplifying control of positioning in the Y-axis direction of the object-to-be-positioned.

The precision positioning device 1' of Embodiment 2 can precisely position the object-to-be-positioned at any position in a two-dimensional space. Other effects which Embodiment 2 can yield are similar to those of Embodiment 1.

The present invention is not limited to the above-described embodiments. Numerous modifications and variations of the present invention are possible without departing from the spirit of the invention.

For example, expandable/contractible elements other than piezoelectric elements can be used to form the expansion/contraction actuators. Also, the Z-, X-, and Y-axis-direction elastically deformable portions 3a, 3b, and 3c can be variously modified in position and orientation.

The invention claimed is:

1. A precision positioning device for positioning an object with movement in multiple axial directions, the device comprising:

a single unitary structure comprising a base portion, a vertical portion standing upright from the base portion and a horizontal portion extending horizontally from the vertical portion and perpendicular to the vertical portion;

wherein the horizontal portion comprises a first tubular member at a distal end and a second tubular member between the first tubular member and the vertical portion;

two expansion/contraction actuators incorporated into the first and second tubular members, respectively, said expansion/contraction actuators having stacking directions oriented in X-axis and Y-axis horizontal directions for elastic deformation of the tubular members only in the X-axis and Y-axis directions, respectively; and a tool mount, for mounting the object to be positioned, on an outer peripheral surface of the first tubular member.

2. A precision positioning device according to claim 1 wherein the horizontal portion is bent in a horizontal plane to divide the horizontal portion into, on opposing sides of the bend, a distal side horizontal portion in which the first tubular member is located and a proximal side horizontal portion in which the second tubular member is located.

3. A precision positioning device according to claim 1 wherein the expansion/contraction actuators each comprise a plurality of piezoelectric elements stacked to define a stacking direction.

4. A precision positioning device according to claim 3 wherein the expansion/contraction actuators each further comprise a plurality of electrodes arranged alternately in layers with the piezoelectric elements.

5. A precision positioning device according to claim 1 wherein:

the vertical portion defines a vertical Z-axis;

the X-axis and the Y-axis define a horizontal plane perpendicular to the Z-axis; and the first and second tubular members are formed symmetrically with respect to (1) an X-Z plane passing through the axis of the vertical portion, (2) an X-Y plane passing through the axis of the horizontal portion and (3) a plane which passes through an axis along the expansion/contraction direction of the expansion/contraction actuator in the first tubular member and which is parallel to a Y-Z plane.

6. A precision positioning device according to claim 1 wherein each tubular member has a cross-section in the shape of an ellipse with long and short axes of symmetry at right angles relative to each other and wherein each expansion/contraction actuator has opposing ends respectively connected to two opposing wall portions of a tubular member and extends between its opposing ends along the short axis of symmetry of the tubular member.

7. A precision positioning device for positioning an object with movement in multiple axial directions, the device comprising:

a single unitary structure comprising a base portion, a vertical portion standing upright from the base portion and a horizontal portion extending horizontally from the vertical portion and perpendicular to the vertical portion;

wherein the vertical portion comprises a first tubular member;

wherein the horizontal portion comprises a third tubular member at a distal and a second tubular member between the third tubular member and the vertical portion;

three expansion/contraction actuators incorporated into the first, second and third tubular members, respectively, said expansion/contraction actuators having stacking directions oriented in a Z-axis vertical direction and in Y-axis and X-axis horizontal directions, respectively, for elastic deformation of the tubular members only in the X-axis, Y-axis and Z-axis directions, respectively; and a tool mount, for mounting the object to be positioned, on an outer peripheral surface of the third tubular member.

8. A precision positioning device according to claim 7 wherein the horizontal portion is bent in a horizontal plane to divide the horizontal portion into, on opposing sides of the bend, a distal side horizontal portion in which the third tubular member is located and a proximal side horizontal portion in which the second tubular member is located.

9. A precision positioning device according to claim 7 wherein the expansion/contraction actuators each comprise a plurality of piezoelectric elements stacked to define a stacking direction.

10. A precision positioning device according to claim 9 wherein the expansion/contraction actuators each further comprise a plurality of electrodes arranged alternately in layers with the piezoelectric elements.

11. A precision positioning device according to claim 7 wherein:

the vertical portion defines the Z-axis;

the X-axis and the Y-axis define a horizontal plane perpendicular to the Z-axis; and the first, second and third tubular members are formed symmetrically with respect to (1) an X-Z plane passing through the axis of the vertical portion, (2) an X-Y plane passing through the axis of the horizontal portion and (3) a plane which passes through an axis along the expansion/contraction direction of the expansion/contraction actuator in the first tubular member and which is parallel to a Y-Z plane.

12. A precision positioning device according to claim 7 wherein each tubular member has a cross-section in the shape of an ellipse with long and short axes of symmetry at right angles relative to each other and wherein each expansion/contraction actuator has opposing ends respectively connected to two opposing wall portions of a tubular member and extends between its opposing ends along the short axis of symmetry of the tubular member.

* * * * *